United States Patent [19]

Seiler et al.

[11] Patent Number: 5,038,300

[45] Date of Patent: Aug. 6, 1991

[54] EXTENDABLE-SIZE COLOR LOOK-UP TABLE FOR COMPUTER GRAPHICS SYSTEMS

[75] Inventors: Larry D. Seiler, Boylston; James L. Pappas, Leominster; Robert C. Rose, Hudson, all of Mass.

[73] Assignee: Digital Equipment Corporation, Maynard, Mass.

[21] Appl. No.: 212,834

[22] Filed: Jun. 29, 1988

[51] Int. Cl.$^5$ ........................ G06F 3/153; G09G 5/06

[52] U.S. Cl. .................................. 364/521; 340/703; 340/701

[58] Field of Search ........................ 340/701, 703, 733; 358/75; 364/200 MS File, 900 MS File, 521

[56] References Cited

U.S. PATENT DOCUMENTS 4,183,046 1/1980 Dalke et al. .......................... 358/22

4,225,861 9/1980 Langdon, Jr. et al. ............ 340/703

4,484,187 11/1984 Brown et al. ...................... 340/703

4,727,425 2/1988 Mayne et al. ......................... 358/80

4,769,632 9/1988 Work et al. ......................... 340/701

4,835,527 5/1989 Hersh ................................ 340/703

*Primary Examiner*—Gary V. Harkcom

*Assistant Examiner*—Raymond J. Bayerl

*Attorney, Agent, or Firm*—Cesari and McKenna

[57] ABSTRACT

A video display system for a computer graphics workstation expands the color look-up table external to the video digital-to-analog (DAC) chip by providing, for each color, a bank of one or more color look-up table extender chips. The extender chips for a given color are connected in series and the banks are connected in parallel between the frame buffer and the video DAC chip. On a pixel-by-pixel basis, and for each color channel, one of the look-up tables afforded by the extender chips or the video DAC chip is accessed using an index from the frame buffer.

17 Claims, 5 Drawing Sheets

EXTENDABLE-SIZE COLOR LOOK-UP TABLE FOR COMPUTER GRAPHICS SYSTEMS

RELATED APPLICATIONS

This invention is related to patent application Ser. No. 206,026 filed on June 13, 1988 and entitled "PIXEL LOOK-UP IN MULTIPLE VARIABLY-SIZED HARDWARE VIRTUAL COLORMAPS IN A COMPUTER VIDEO GRAPHICS SYSTEM", to patent application Ser. No. 206,203 filed on June 13, 1988 and entitled "WINDOW DEPENDENT PIXEL DATATYPES IN A COMPUTER VIDEO GRAPHICS SYSTEM" and to patent application Ser. No. 213,197 filed on even data herewith and entitled "SPRITE CURSOR WITH EDGE EXTENSION AND CLIPPING". Each of these names the same inventors as, and is assigned to the assignee of, the present invention. The disclosures of these related applications are incorporated herein by reference.

FIELD OF THE INVENTION

The invention generally relates to computer graphics workstations and, more particularly, to video display sub-systems thereof.

BACKGROUND OF THE INVENTION

In a video display sub-system of a graphics workstation, a color look-up table is normally used to map binary values stored in a frame buffer to color values. For that reason, it is also referred to as a "colormap". The color values are fed to digital-to-analog converters ("video DAC's"), which drive a monitor, printer or other output display device.

Typically, a color look-up table is furnished for each color channel—red, green and blue—and is stored in random access memory ("RAM"). In the past, the RAM was implemented in emitter coupled logic ("ECL") and was disposed on a separate chip from that of the video DAC.

Recently, higher density CMOS technology has made it desirable to integrate the color look-up table into the video DAC chip. This approach has several advantages, for example, it is economical to implement and requires less power than that of the above-mentioned ECL implementation. Unfortunately, the size of the color look-up tables is limited by the amount of RAM that can be accommodated on the video DAC chip. While suitable for many applications, the look-up table is insufficient to support certain applications such as those which take advantage of multi-window architectures, or are used for natural imaging. This limitation is brought into sharper focus when it is realized that a state-of-the-art layout editor requires a 256×8 look-up table, which is the entire capacity of an eight plane color look-up table implemented on the video DAC chip.

Consider further the insufficiency of memory space on the video DAC chip. A twenty-four plane look-up table can handle a single natural image created on a CRT screen. If a user takes advantage of windowing, known windowing software packages try to "virtualize" the look-up table, or give each window a certain part of the look-up table for its own private use. This is done because of the desired independence of the windows—i.e., an application in one window employs colors which can be selected and manipulated independent of the colors maintained for other unrelated windows.

Eventually, however, the amount of memory space available for the color look-up table is fully used. Thereafter, the windowing software has to make compromises, such as having windows share color look-up table space. Such an approach affects the appearance of the displayed image by reducing the chromatic integrity of the displayed colors as additional windows are opened. To ameliorate this effect, known software packages maintain true color for the top level or "priority" window by sacrificing the color of other displayed windows.

A known hardware solution to the problem of insufficient color look-up table size is to furnish a bank of parallel RAM's, each implemented on a separate chip using ECL bipolar technology. Since the RAM's are on separate chips, the look-up table can be expanded to whatever size is required. A twelve bit wide address bus references the memories with eight bit wide signals and a data bus directs the referenced color values from one or another of the RAM chips to the DAC chip. A chip select logic uses the remaining four bits from the address bus to select the look-up table that is to output its data. Important for a graphics application, high pixel rates and fast chip-to-chip communication is characteristically attained by ECL technology.

Unfortunately, this circuit arrangement does not lend itself to the afore-described CMOS technology for several reasons. First, chip-to-chip communication is too slow and generally will not meet the real-time speed and response requirements of state-of-the-art interactive graphics workstations. Second, where one of the color look-up tables is implemented on the video DAC chip as is generally the case, access to the data bus leading between that look-up table and the DAC is not readily had. Were the data bus brought off the chip, many more pins would be needed on the video DAC chip to accommodate the resulting inter-chip communication. Unfortunately, this would be an uneconomical proposition, if it could be implemented at all. Given the typical pin requirements for the DAC, it is unlikely that sufficient space would be available on the chip for the requisite number of pins. In addition to such packaging constraints, off-chip communication with the data bus is undesirable due to the higher power levels needed to drive outputs from CMOS chips.

SUMMARY OF THE INVENTION

Briefly, the invention resides in a video display system for a computer graphics workstation which expands the color look-up table external to the video DAC chip by providing, for each color, a bank of one or more color look-up table extender chips. The extender chips for a given color are connected in series and the banks are connected in parallel between the frame buffer and the video DAC chip. On a pixel-by-pixel basis, and for each color channel, one of the look-up tables afforded by the extender chips or the video DAC chip is accessed using a video signal, e.g., an index from the frame buffer.

Chip selection logic selects which of the color look up tables is to feed its referenced entry to the video DAC for a particular pixel. When a received video signal is not used to reference the chips look-up table, it is shunted around the look-up table and passed to the next extender chip or video DAC chip, whichever the case may be.

Furthermore, in a preferred practice of the invention, compensation for signal delays attributable to memory accesses is achieved on each chip containing a look-up table by selectively introducing delays in the cursor, blank and sync signals, as well as those video signals shunted around the chips' look-up table. This assures that these signals are all shifted by the same period of time as it takes to access the look-up table and read out the referenced entry, so that all related signals corresponding to a particular pixel are receivable simultaneously in an appropriate pixel-to-pixel order by a color monitor or other display device.

BRIEF DESCRIPTION OF THE DRAWINGS

For a fuller understanding of the features, advantages, and objects of the invention, reference should be made to the following detailed description and the accompanying drawings, in which.

DETAILED DESCRIPTION OF THE ILLUSTRATIVE EMBODIMENT

Figure 1:
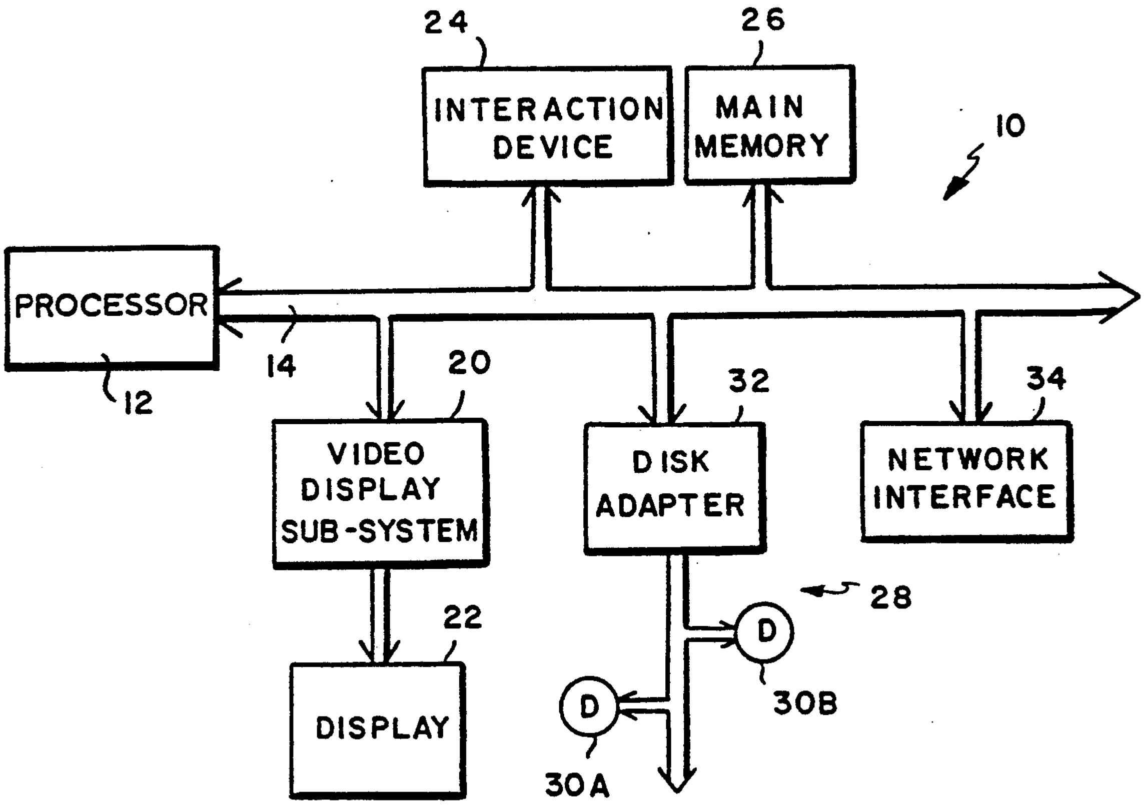
FIG. 1 is a block diagram showing the relationship of a video display subsystem to other hardware of a computer graphics workstation.

With reference to FIG. 1, there is shown a block diagram of a computer graphics workstation 10 constructed in accordance with the invention. The hardware comprising the workstation 10 includes a processor 12 having a processor bus 14. Processor bus 14 allows the processor 12 to communicate with at least one interaction device 24, a main memory 26 and a video display sub-system 20 which is connected to a display 22, such as a monitor, printer or plotter. The interaction device 24 is a keyboard, mouse, touch screen, data tablet or other means for permitting a user to create and manipulate graphics. Graphics generated in color by the video display sub-system 20 is fed to the display device 22 for presentation on a screen or by physical media (not shown).

Also, a disk storage system 28 including one or more disk drives 30A, 30B is connected to bus 14 through a bus adaptor 32. With the provision of the disk storage system 28, the workstation 10 can be used as a stand-alone system. Optionally, the workstation 10 has a network interface 34 in lieu of or in addition to the disk storage system 28. The network interface 34 is useful for connecting the processor bus 14 to a local area or public network.

Figure 2:
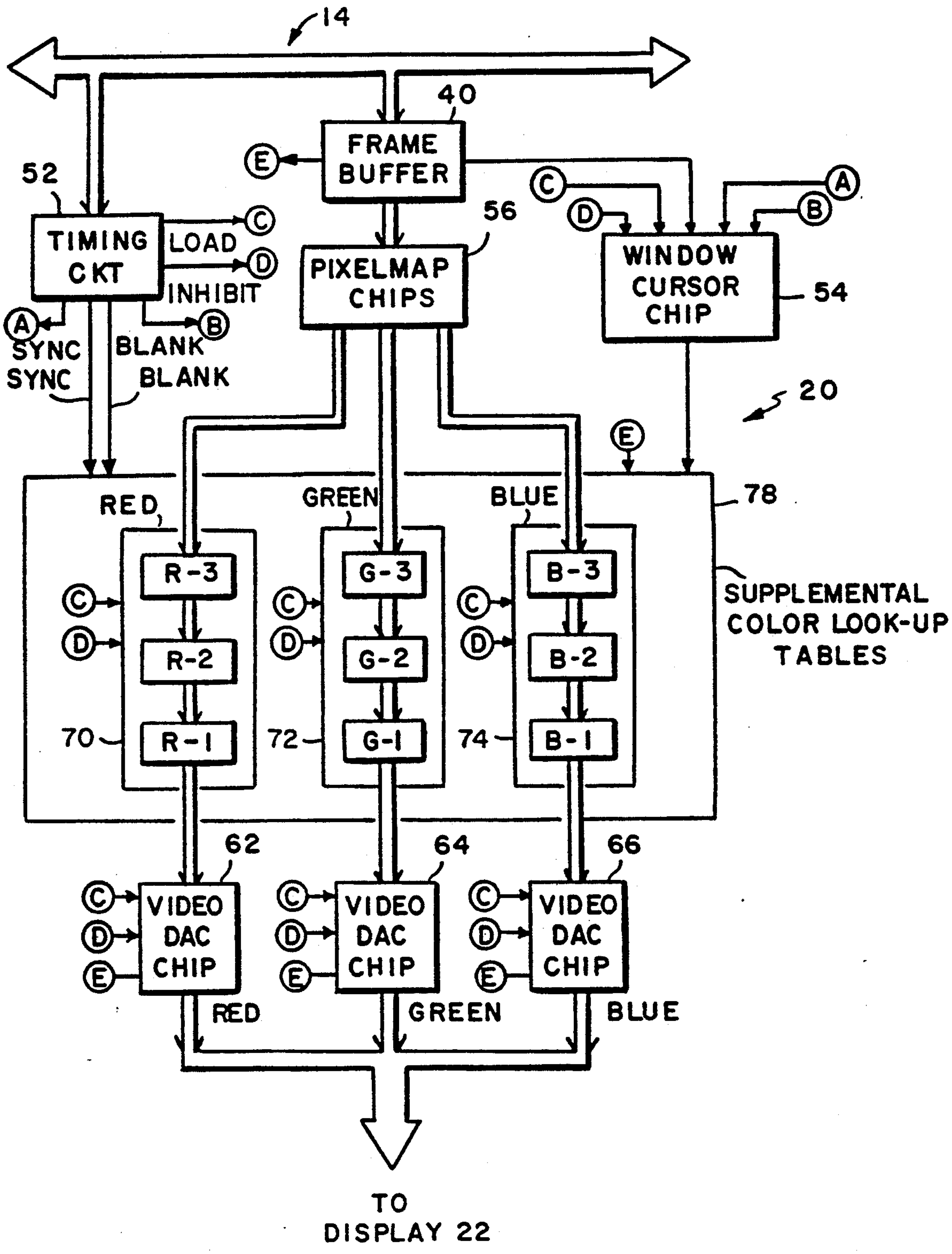
FIG. 2 is a block diagram showing novel features of the video display sub-system of FIG. 1 in accordance with the invention.

The video display sub-system 20 is shown in more detail in FIG. 2. Connected to the processor bus 14 is a frame buffer 40 for storing indexes into a look-up table, and a timing circuit 52. Connected to the frame buffer 40 are a window/cursor chip 54 and pixelmap chips 56.

The timing circuit 52 generates BLANK and SYNC signals for use by the monitor 22, and control signals for loading the window/cursor chip 54, the pixelmap chips 56 and the color look-up table as further described below. The BLANK signal turns the monitor beam on or off while tracing vertically or horizontally. The SYNC signal instructs the monitor 22 to retrace. The generation and use of the BLANK and SYNC signals are well known to those skilled in the art.

The window/cursor circuit chip 54 generates a cursor for display on the monitor 22. It also keeps track of the current position of the monitor beam and generates a window number corresponding to the window in which the beam is positioned. A geometric description of the window is stored in the order of priority, the priority indicating which window should be displayed in the event windows overlap.

The pixelmap chips 56 allow a plurality of color look-up tables to be accessed. To achieve this, the pixelmap chips 56 use the window number from the window/cursor chip 54 in obtaining an offset into the color look-up table. Such an arrangement is particularly useful in multi-window applications since the total color look-up table can be segmented into a plurality of logical look-up tables. Each logical look-up table can be dedicated to a different window.

More specifically, for each pixel, the pixelmap chips 56 receive the index from the frame buffer 40 and the associated window number from the window/cursor chip 54. The pixelmap chips 56 contain a table of mapping configuration entries, each associated with one of the window numbers. The window number is used as an index into the mapping configuration table, and an offset recovered from the referenced word is used to modify the index from the frame buffer 40. This permits each window to be allocated an arbitrary portion of the color look-up table starting at the offset address for the window.

A video DAC chip 62, 64, 66 is provided for each color channel of the monitor 22, e.g., red, green and blue. Each video DAC chip 62, 64, 66 contains a color look-up table, a video digital-to-analog converter, and other devices described below, for providing video and control signals for generating graphics to be displayed on the monitor 22.

For certain applications it is recognized that the look-up table physically implemented on the video DAC chip is insufficient in size to accommodate the desired graphics, particularly, for example, in multi-windowing applications. Consequently, and in accordance with the invention, supplemental look-up table memories 70, 72, 74 are provided, connected in parallel between the frame buffer and the video DAC chips, for storing intensity values for the primary colors, red, green and blue, respectively. Each supplemental look-up table 70, 72, 74 is implemented in a bank of serially-connected extender chips designated R-1, R-2, R-3 for red, G-1, G-2, G-3 for green, and B-1, B-2, B-3 for blue. The total supplemental look-up table is designated 78.

As is shown in FIG. 2, the frame buffer 40 stores indexes into the supplemental look-up tables 70, 72, 74 as well as into the look-up tables implemented on the video DAC chips 62, 64, 66.

Figure 3:
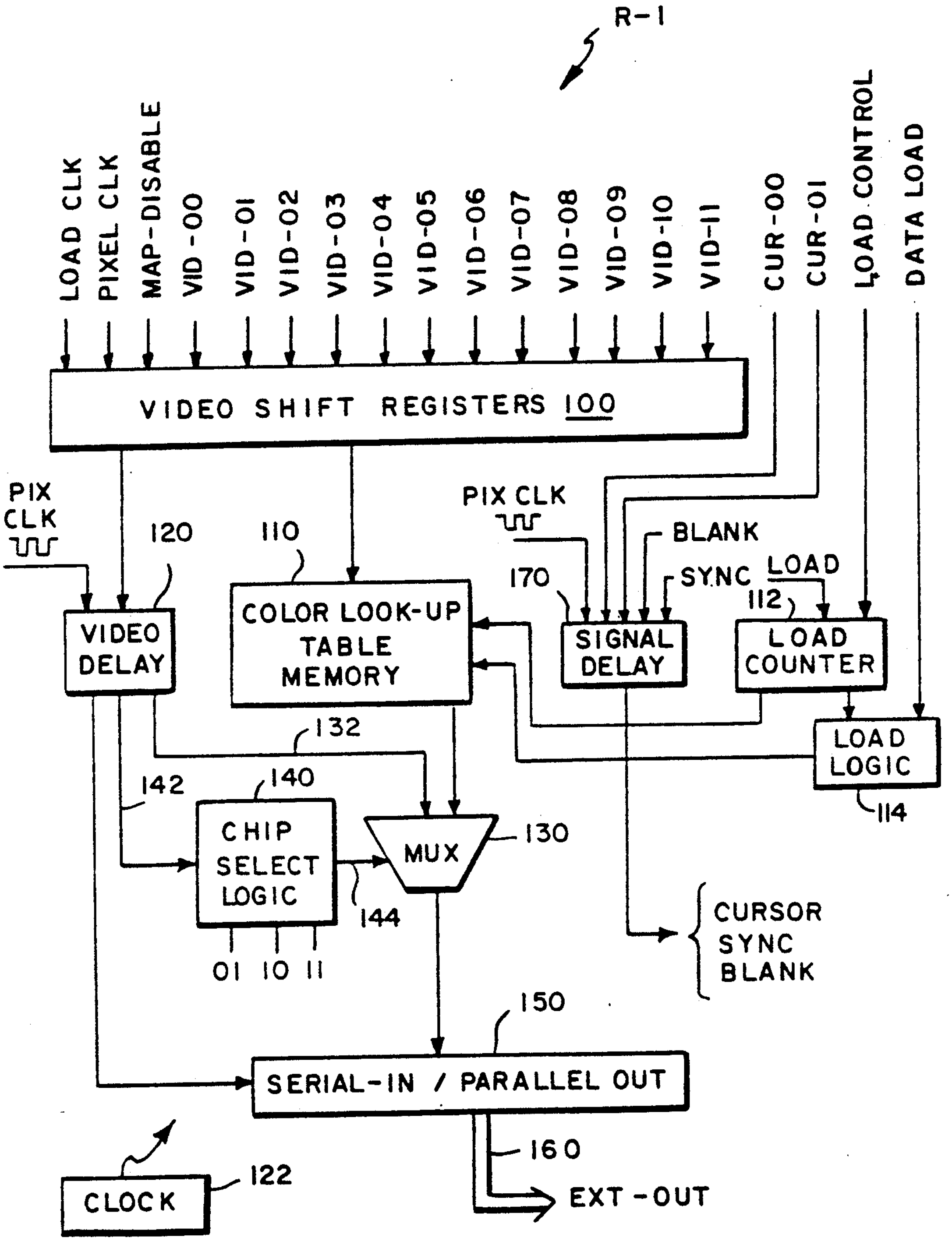
FIG. 3 is a block diagram of an extender chip on which is implemented one of the supplemental look-up tables shown in FIG. 2.

FIG. 3 shows a illustrative implementation of extender chip R1 made in accordance with the present invention. The extender chips R1, R2, R3, G1, G2, G3 and B1, B2, B3 are all generally of the same illustrated construction.

As shown, shift registers 100 are employed to convert a plurality of parallel, four-bit input signals, which are each received from the preceding chip R2 and correspond to an image pixel, into a serial output signal. This is achieved in a conventional manner by loading, four-bit registers (not separately shown) in parallel, and unloading them in series. Signals pertaining to pixel after pixel are processed in this manner to form successive video bit streams.

The reason for using the shift registers 100 lies in the difference between the inter-chip and intra-chip communication rates attainable with CMOS technology. Pixel rates within a CMOS chip can be, for example, 125 MHz, a rate in excess of the typical maximum inter-chip rate. In order to achieve inter-chip data transmission to support such an intra-chip rate, the communication between chips is carried out by sending the data in parallel signals. The shift registers 100 are used to "translate" the parallel inter-chip signals into serial data signals, shifted out at the higher rate for use within the chip R1.

The inputs to the video shift registers 100 include twelve video signals designated VID-00 through VID-11 for transferring a total of 48 bits of video data in parallel. The video signals VID-10 and VID-11 are formed by the addition of the offset generated by the pixelmap chips 56 and the index from the frame buffer 40. Another two four-bit signals CUR-00, CUR-01 come from the window/cursor circuit 54 (FIG. 2). The window/cursor circuit 54 controls a cursor displayed on the monitor 22 (FIG. 1). BLANK and SYNC signals are used to reset internal counters that track the x-y position of the monitor. When the monitor position reaches the first pixel of the cursor, the window/cursor circuit 54 begins to output cursor data.

A video bit stream based on the video signal VID-00 through VID-11 is provided by the video shift registers 100 to both a memory 110 for physically storing a supplemental color look-up table and a video delay circuit 120.

The color look-up table memory 110 is implemented as a 1K by 10 RAM, for example. It receives the video bit streams based on video signals VID-00 through VID-09 from the registers 100. The video bit stream contains either the address of color information stored in the look-up tables or the color information itself depending on whether either of the supplemental tables on the previous chips R2, R3 have been addressed. Using the video bit stream as a ten bit index, the memory 110 reads out the intensity value stored at the locations addressed by the index. The referenced color look-up table entry is transferred out of the memory 110 to a multiplexer 130, as its first input.

The contents of the color look-up table are loaded into the memory 110 by the cooperative operation of a load logic 112 and load counter 114. The load logic 112 receives a "load data" signal E from the frame buffer 40 (FIG. 2) and generates a word therefrom which is to be stored within the color look-up table. The load counter 112 generates an address in the color look-up table memory 110 into which the output word from the load logic 114 is written whenever the load logic 112 and load counter 114 receive a "load initiate" control signal C from the timing circuit 52 (FIG. 2). Additional control signals can be received therefrom as well, such as a "load inhibit" signal D which, when asserted interrupts loading temporarily without resetting the load counter 114.

A video bit stream, this time based on video signals VID-00 through VID-11, is supplied to the video delay 120 from the shift registers 100. A PIXEL CLOCK signal from clock 122 is also fed to the video delay 120. The video delay 120 delays each received signal by the number of pulses of the PIXEL CLOCK signal equal to that required for a memory access into the color look-up table memory 110 and the reading out of a referenced entry stored therein. The delayed signal is fed to the multiplexer 130 as its second input. Thus, for each pixel, the output ±rom the video delay 120 and the referenced look-up table entry reaches the multiplexer 130 at the same time.

The video delay 120 also furnishes the higher order signals VID-10 and VID-11 to a chip select logic 140, which also receives two-bit select signals each identifying one of the extender chips R1, R2, R3. Where the combination of digits formed by the VID-10 and VID-11 signals matches the select signal corresponding to the extender chip R1, the chip select logic 140 furnishes a control signal to the multiplexer 130 which enables it to pass the referenced entry from the color look-up table memory 110. Otherwise, the output of the video delay 120 is passed.

For example, the illustrated extender chip R1 is assigned, as its identification, a BINARY 01 value and the other two extender chips R2, R3 in supplementary color look-up tables 70 (FIG. 2}have respective identification numbers of BINARY 10 and 11. Where the VID-10 and VID-11 signals form BINARY 01, the chip select logic will cause the multiplexer 130 to output the value from the color look-up table memory 110 of the R1 chip. On the other hand, where the VID-10 and VID-11 signals indicate a BINARY 10 or 11 chip selection, then the signal from the video delay 120 is passed by the MUX 130 of chip R1.

Whichever signal is passed by multiplexer 130, it is fed to a serial-in/parallel-out circuit 150 to form a four-way parallel output signal, "EXT-OUT", which is transmitted to DAC-1 over bus 160.

Chip R1 also is provided with a signal delay circuit 170 to assure that all other signals relating to a particular pixel are delayed by the same amount and are output at the same time therefrom. For this, the signal delay 170 receives the PIXEL CLOCK signal from clock 122, and receives the cursor signals CUR-00 and CUR-01 from the preceding extender chip R2, and the BLANK and SYNC signals from the timing circuit 52 (FIG. 2), and delays the cursor, BLANK and SYNC signals by an amount equal to that of the video data path through the extender chip R1. These signals are then fed to the video DAC chip 62.

Having described chip R1, it is appropriate to next consider the other implemented supplemental look-up tables. While the other extender chips R2, R3, G1, G2, G3, B1, B2 and B3 are all of the same general configuration as that just described, certain differences in signal origination exist for chips R3, G3, and B3. For example, in these chips, the video signals are received from the pixelmap chips 56 and the cursor signals are received from the window/cursor circuit 54 (FIG. 2) rather than from the preceding extender chip as is the case for chips R1, R2, G1, G2, B1, B2.

Also, it follows from the above discussion of the operation of the chip select logic 140 that the operation of the multiplexers on each extender chip depends on the chip's binary indentification code or base. In other words, each implemented look-up table is assigned a base at which its address space coverage begins. Continuing the above-given example for look-up tables 70 (FIG. 2), the referenced look-up table entry stored on either chip R2 or R3 is used when VID-10 and VID-11 form BINARY 10 or 11, respectively. Of course, by default, where the video signals VID-10 and VID-11 indicate a BINARY 00, the video delay signal is passed by the MUX 130 for use in accessing the look-up table on the video DAC chip 62 (FIG. 2). The chip select logic implemented for look-up tables 72, 74 operates similarly.

Figure 4:
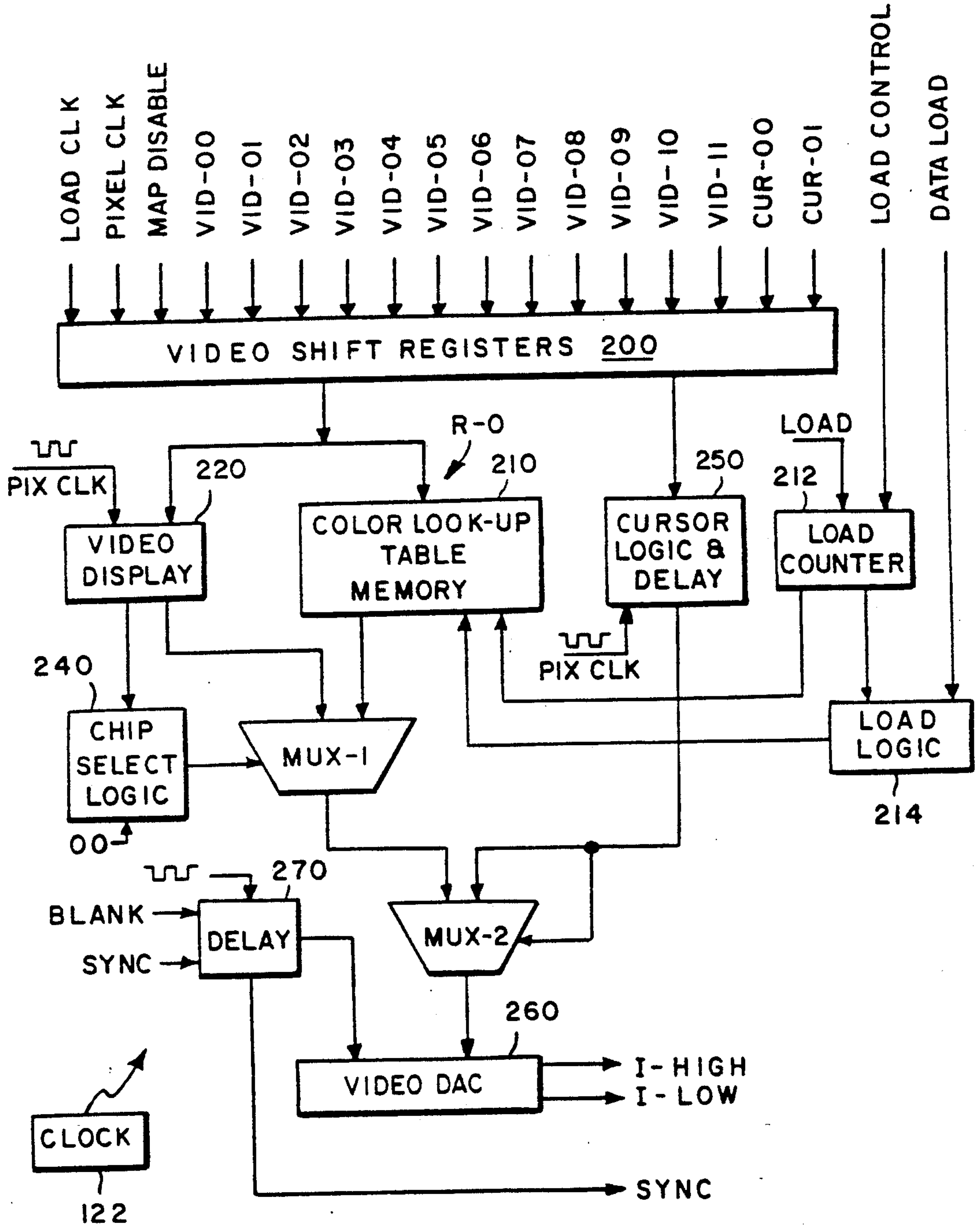
FIG. 4 is a block diagram of the video DAC chip shown in FIG. 2.

FIG. 4 shows one example of the video DAC chip 62 which employs the present invention. Each of the video DAC chips 62, 64, 66 is generally of the same illustrated construction.

As can be seen in FIG. 4, the video DAC chip 62 has video shift registers 200, a color look-up table memory 210, a video delay 220, load logic 214 and a load counter 212 respectively similar to registers 100, memory 110 delay 120, load logic 114 and load counter 112 of FIG. 3. Also, as described above, a multiplexer identified as MUX-1 performs a similar function to MUX 130 (FIG. 3) in that it passes the color look-up table entry (referenced by the index from the video shift registers 200 based on video signals VID-00 through VID-09) whenever the chip select logic receives a video signal VID-10 and VID-11 forming, for example, BINARY 00. For all other select values, MUX-1 passes the delay signal from the video delay 220.

In addition, a cursor logic and delay 250 is provided for generation of cursor overlay color signals based on cursor control signals CUR-00 and CUR-01 received from the video shift registers 200. Essentially, the cursor logic and delay 250 has multiple memory locations each corresponding to a particular non-zero value of cursor signals CUR-00 and CUR-01. The cursor memory locations are loaded with cursor overlay data from the frame buffer 40 (FIG. 2). For any non-zero cursor signal value, the cursor logic and delay 250 causes a second multiplexer MUX-2 to output the contents of one of the cursor memory locations. This causes a selected cursor color to be the output from the MUX-2. When the cursor signal value is zero, however, the input from the first multiplexer MUX-1 is transferred by the second multiplexer MUX-2. Thus, certain values of the cursor signals CUR-01 supersede the video signals VID-00 through VID-11 in determining the output from the two multiplexers MUX-1, MUX-2.

In generating its output signal, the cursor logic and delay 250 delays the output cursor signal by the same amount as the delay of the video signal being fed to the MUX-2 by MUX-1 pursuant to the PIXEL CLOCK signal received from clock 122.

A fuller description of the cursor logic can be had with reference to the above-mentioned related Patent Application entitled "PIXEL LOOK-UP IN MULTIPLE VARIABLY-SIZED HARDWARE VIRTUAL COLORMAPS IN A COMPUTER VIDEO GRAPHICS SYSTEM".

As is also shown, a video digital-to-analog converter or "video DAC" 260 is provided to receive the output from the second multiplexer MUX-2 and produce therefrom a plurality of analog output current signals "1 HIGH" and "1 LOW" suitable to a drive color gun (not shown) for a CRT display 40 (FIG. 1). To that end, the video DAC 260 receives the output from the second multiplexer MUX-2, and BLANK and SYNC signals from the timing circuit 52 (FIG. 2) via a delay circuit 270. The delay circuit 270 introduces a pre-selected delay clocked by the same clocking signal mentioned above. The delay circuit 270 also outputs a delayed version of the SYNC signal directly to the monitor. Thus, it can be seen that compensation for memory access delays is also provided in the monitor timing signals, BLANK and SYNC. The delay introduced into the BLANK and SYNC signals are aligned with the video signals being supplied to the video DAC.

In practicing the invention the various delays introduced by memory access to the look-up tables are generally inconsequential in terms of operation of the workstation and perceptions of the operator. Furthermore, in order to maintain the appropriate pixel-by-pixel sequence, the video cursor, BLANK and SYNC signals are all delayed by the same length of time. To illustrate this, where the SYNC and BLANK signals are latched on the low to high transition of a clock pulse of the PIXEL clock signal supplied from clock 122 to video delay 120 and signal delay 170 of FIG. 3 and the delay 270 of FIG. 4, the BLANK and SYNC signals are delayed typically by an amount between zero and fifteen pulses to compensate for the delays in the video signals caused by memory access, the precise length of the delay depending on the particular implementation of the invention, and readily determinable by those skilled in the art.

Figure 5:
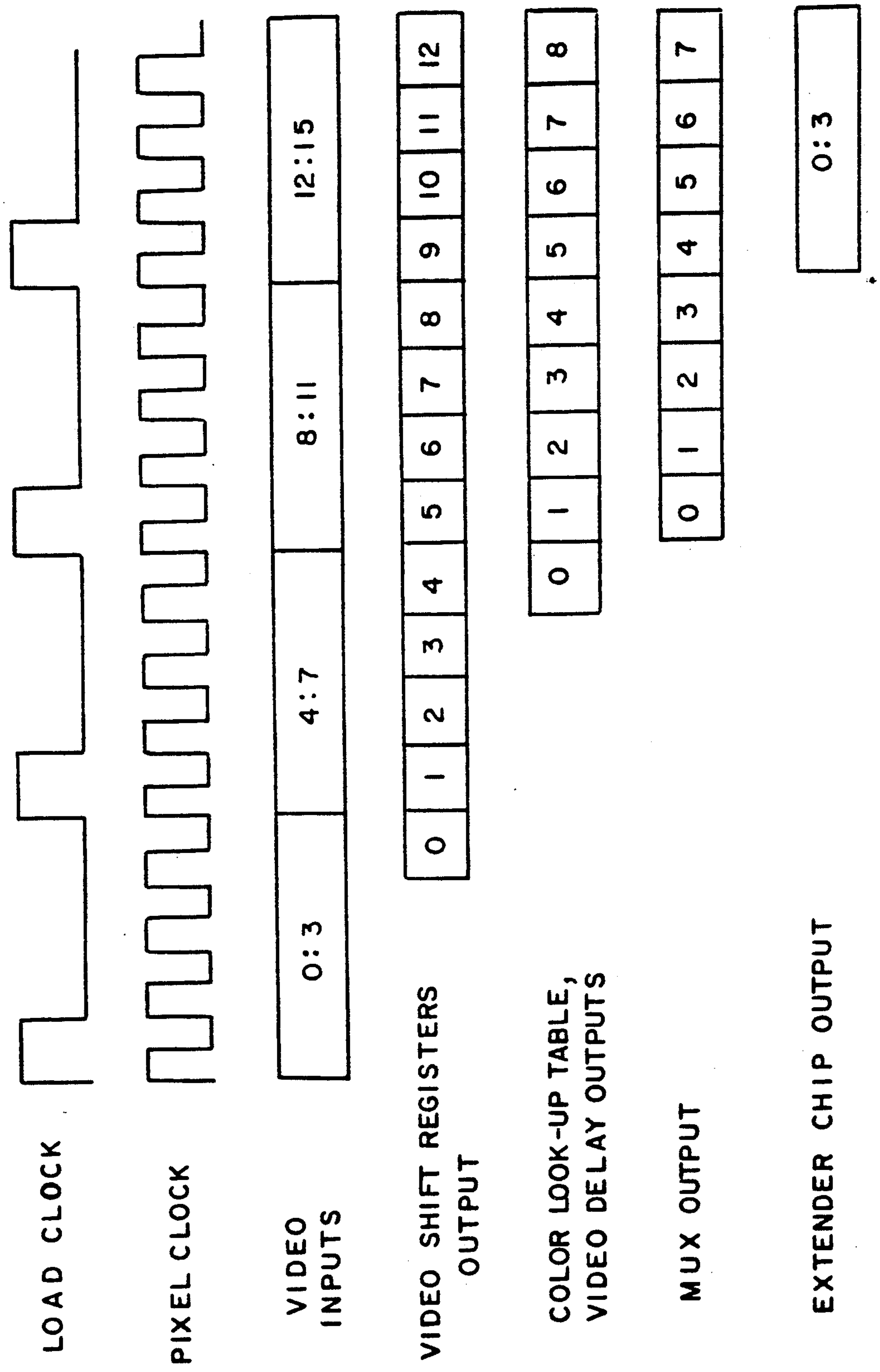
FIG. 5 is a timing diagram illustrating the internal delays in the extender chip of FIG. 3.

To further understand the internal delays within the extender chip R1, FIG. 5 shows the relationship of the various signals. It will now be discussed with renewed reference to FIG. 3. The LOAD CLOCK shows the timing of the input signals VID INPUTS into the shift registers 100. The LOAD CLOCK signal is generated by clock 122 to have a frequency which is one-fourth that of the PIXEL CLOCK signal. The VID INPUTS are representative of each pixel, with pixel 0 though 3 being received during the first illustrated clock cycle of the LOAD CLOCK, pixel 4 through 7 being received during the next cycle and so forth. The video shift registers output is shown as being delayed by three PIXEL CLOCK cycles with respect to its input, while the outputs from the color look-up table memory 110 and the video delay 120 are delayed by an additional four PIXEL CLOCK cycles. The output from the multiplexor 130 suffers another one PIXEL CLOCK cycle delay. The total delay of the EXT-OUT signal with respect to the VID INPUT signal amounts to twelve PIXEL CLOCK cycles.

In certain applications it is desirable to disable the use of the color look-up tables, such as during use of external support logic (not shown). For that purpose a "MAP DISABLE" signal is provided to each extender chip (shown as an input to the registers 100 in FIG. 3) as well as to the video DAC chip 62. If the MAP DISABLE signal is asserted, the chip selection logic 140 and 240 forces the selection of the output from the respective video delay 120 or 220 to be outputted from the respective multiplexer 130 or MUX-1, regardless of the video selection signals VID-10 and VID-11.

It can now be seen that, for example, a 1K by 10 memory implemented in a video DAC chip can be expanded to a 4K by 10 memory by using three 1K by 10 extender chips and can be expanded even more through the use of external support logic driving the "map disable" input.

Furthermore, the invention is implemented in a way which coordinates its use with cursor logic. A bit stream is used to select pixel by pixel between video data and a pluralitY of cursor overlay colors. Thus, a cursor may have colors different from all the colors in the colormap.

Finally, the extender chip provides improved overall packaging by readily accommodating the additional pins associated with the supplemental color look-up table memories and the cursor logic. This eliminates the need for the video DAC chip to have the additional pins needed for these features which would carry a heavy cost burden. Advantageously, systems incorporating the supplemental look-up tables can nevertheless utilize the same video DAC chip used in basic systems not providing these features, thereby realizing economics of scale by standardizing on the video DAC chip.

The foregoing description has been limited to a specific embodiment of this invention. It will be apparent, however, that variations and modifications may be made without departing from the spirit of the invention.

It is accordingly intended that all matter contained in the above description or shown in the accompanying drawings be interpreted as illustrative rather than restrictive, with the scope of the invention being indicated by the appended claims. All changes which come within the meaning and range of equivalency of the claims are therefore intended to be embraced herein.

Having described this invention, what is claimed as new and secured by Letters Patent is:

1. A computer video graphics system for driving a plurality of color channels for generating color image pixels on a monitor, comprising:

A. a plurality of digital-to-analog converters each associated with one of said color channels for converting an intensity value for each pixel into an analog signal for display by said monitor;

B. a plurality of memory banks each including a plurality of color look-up table memories, each said color look-up table memory for storing digital values representative of color intensities, each said bank associated with one of said color channels and coupled to said digital-to-analog converter associated with said channel to selectively transfer from one of said plurality of look-up table memories to said digital-to-analog converters the intensity value that corresponds to an index value; and C. wherein said memory banks are arranged in parallel, and said color look-up table memories within each bank are connected in series.

2. The computer graphics system of claim 1 wherein for each color channel one of said look-up table memories and digital-to-analog converters associated therewith are implemented on the same chip.

3. The computer video graphic system of claim 2 wherein each look-up table memory is implemented on a chip separate from the other look-up table memories.

4. The computer video graphics system in accordance with claim 1, further comprising selection means associated with each plurality of memories, responsive to a control signal for passing from one memory to the next either the intensity value stored in said one memory or the index value.

5. A computer video graphics system for driving a plurality of color channels for generating color image pixels on a monitor, comprising:

A. a frame buffer for storing a plurality of index values

B. a plurality of digital-to-analog converters each associated with one of said color channels for converting an intensity value for each pixel into an analog signal for display by said monitor;

C. a plurality of memory banks each including a plurality of color look-up table memories, each said color look-up table memory for storing digital values representative of color intensities, each said bank associated with one of said color channels and coupled to said digital-to-analog converter associated with said channel to selectively transfer stored intensity values corresponding to said index values to said digital-to-analog converter, said banks being connected in parallel to said frame buffer, said memories within each bank being connected in series;

D. means for generating a control signal for selecting, on a pixel-by-pixel basis, the look-up table memory of each bank which is to transfer the corresponding intensity value to the associated digital-to-analog converter; and E. a plurality of multiplexer means, one associated with each said memory, each said multiplier means receiving the index value from said frame buffer as a first input and the corresponding intensity value from said associated one of said memories as a second input, and for transferring to a next memory one of said first and second inputs in response to said memory-selecting control signal.

6. The computer video graphics system of claim 5 further including means for transferring each index value to said multiplexer means, and for delaying each said transferred one of said first and second inputs by a length of time substantially equal to the time required to access the associated bank of look-up table memories with said index value and transfer therefrom one of the stored intensity values.

7. A computer graphics workstation comprising a processor; a processor bus; an interaction device; main memory; and video display system coupled to said processor by said processor bus; a display coupled to said video display system; said video display system driving a plurality of color channels for generating image pixels on said display, and said work station including:

A. a frame buffer for storing a plurality of index values;

B. a plurality of digital-to-analog converters each associated with one of said color channels for converting an intensity value for each pixel into an analog signal for controlling said display;

C. a plurality of memory banks each including a plurality of color look-up table memories, each said color look-up table memory for storing digital values representative of color intensities, each said bank associated with one of said color channels and coupled to said digital-to-analog converter associated with said channel to selectively transfer stored intensity values corresponding to said index values to said digital-to-analog converter, said banks being connected in parallel to said frame buffer, said memories within each bank being connected in series;

D. means for generating a control signal for selecting on a pixel-by-pixel basis, the look-up table memory of each bank which is to transfer the corresponding intensity value to the digital-to-analog converter; and E. a plurality of multiplexer means, one associated with each said memory, each said multiplexer means receiving the index value from said frame buffer as a first input and the corresponding intensity value from said associated one of said memories as a second input, and for transferring to a next memory one of said first and second inputs in response to said memory-selecting control signal.

8. A computer video graphics system for driving a plurality of color channels for generating color image pixels on a monitor, said computer video graphics system comprising:

A. a frame buffer for storing a plurality of index values;

B. a plurality of digital-to-analog converters each associated with one of said color channels for converting an intensity value for each pixel into an analog signal for display by said monitor;

C. a plurality of memory banks each including a plurality of color look-up table memories, each said color look-up table memory for storing digital values representative of color intensities, each said bank associated with one of said color channels and coupled to said digital-to-analog converter associated with said channel, said banks being connected in parallel to said frame buffer, said memories within each bank being connected in series;

D. wherein, each said color look-up table memory receives index values from said frame buffer, and, for each received index value, supplies a corresponding intensity value stored therein; and E. first selection means connected to receive said intensity values from said color look-up table memories for transferring, in response to a first control signal, a selected one of said corresponding intensity values from each bank to an output line.

9. The computer graphics workstation of claim 8 further including means for transferring the index value to said multiplexer, and for delaying said index value by a length of time substantially equal to the time required to access the associated look-up table memory and transfer therefrom one of the stored intensity values.

10. The computer graphics workstation of claim 9 wherein for each color channel the associated look-up table memory and digital-to-analog converter is implemented on the same chip.

11. The computer graphics workstation of claim 10 wherein each look-up table memory is implemented on a separate chip.

12. A computer video graphics system in accordance with claim 8, wherein some of said color look-up table memories are implemented on the same semiconductor chips as said digital-to-analog converters, and others are implemented on semiconductor chips separate from said digital-to-analog converters.

13. A computer video graphics system in accordance with claim 8, further including means for providing a cursor signal, and second selection means connected to receive said transferred intensity values from said first selection means and said cursor signal, and, in response to a second control signal, transferring one of said transferred intensity values and said cursor signal from each bank to the associated digital-to-analog converter.

14. A computer video graphics system for driving a plurality of color channels for generating color image pixels on a monitor, comprising:

A. a plurality of serially connected color look-up table memories associated with each said color channel, each of said memories for storing digital values representative of color intensities, and for passing the stored color intensity value referenced by a video signal to an output line associated with said memory, the video signal of a first of said memories being an index value;

B. a plurality of selection means each (i) associated with one of said memories, (ii) coupled to receive said referenced color intensity value over said output line for its associated memory, and (iii) responsive to a control signal for passing a selected one of said received intensity value and said index value as an output signal, said output signal from the selection means which is associated with memories other than the last of the serially connected memories serving as the video signal for the next of said serially connected memories, and said output signal from the last selection means which follows the last of the serially connected memories being the look-up table output, only one of said selection means passing a referenced color intensity value received from the memory associated therewith; and C. a digital-to-analog converter coupled to receive said look-up table output, and associated with each said color channel for converting a video signal for each of a plurality of pixels into an analog signal for display by said monitor.

15. The computer video graphics system in accordance with claim 14, further including second means coupled to receive said look-up table output and a cursor signal, and responsive to a control signal for passing a one of said look-up table output and said cursor signal to said digital-to-analog converter.

16. The computer video graphics system in accordance with claim 14, wherein said digital-to-analog converter and one of said memories is implemented on a first semiconductor chip, and the other or others of said memories are implemented on one or more, different semiconductor chip.

17. A computer video graphics system for driving an intensity channel for generating image pixels on a monitor, comprising:

A. a plurality of serially connected look-up table memories associated with said channel, each of said memories for storing digital values representative of intensities, and for passing the stored intensity value referenced by a video signal to an output line associated with said memory, the video signal of a first of said memories being an index value;

B. a plurality of selection means each (i) associated with one of said memories, (ii) coupled to receive said referenced intensity value over said output lien for its associated memory, and (iii) responsive to a control signal for passing a selected one of said received intensity value and said index value as an output signal, said output signal from the selection means which is associated with memories other than the last of the serially connected memories serving as the video signal for the next of said serially connected memories, and said output signal from the last selection means which follows the last of the serially connected memories being the look-up table output, only one of said selection means passing a referenced intensity value received from the memory associated therewith; and C. a digital-to-analog converter coupled to receive said look-up table output, and associated with said channel for converting a video signal for each of a plurality of pixels into an analog signal for display by said monitor.

* * * * *